United States Patent [19]

Silverberg

[11] Patent Number: 5,095,372

[45] Date of Patent: Mar. 10, 1992

[54] COMBINED COPYING MACHINE AND FACSIMILE SCANNER AND METHOD

[76] Inventor: Morton Silverberg, 24 Edgewater Common, Westport, Conn. 06880

[21] Appl. No.: 458,870

[22] Filed: Dec. 29, 1989

[51] Int. Cl.⁵ ............................................. H04N 1/00
[52] U.S. Cl. ..................................... 358/401; 358/468
[58] Field of Search ................ 355/202, 41; 358/401, 358/468

[56] References Cited

U.S. PATENT DOCUMENTS

| | | | |
|---|---|---|---|
| 3,597,071 | 7/1971 | Jones | 355/3 |
| 4,005,933 | 1/1977 | de Loye et al. | 355/66 |
| 4,166,691 | 9/1979 | Ebi et al. | 358/401 |
| 4,188,113 | 2/1980 | Hiragu | 355/51 |
| 4,783,680 | 11/1988 | Maloney | 355/8 |
| 4,794,419 | 12/1988 | Shibazaki | 355/3 R |
| 4,827,349 | 5/1989 | Ogata et al. | 358/434 |

OTHER PUBLICATIONS

"Hydra" envolves to combine Fax Printer, Copier Wall Street Journal, 2/22/90.

Primary Examiner—Edward L. Coles, Sr.
Attorney, Agent, or Firm—David E. Pitchenik; Melvin J. Scolnick; Robert H. Whisker

[57] ABSTRACT

A combined copy machine and fax signal production device wherein the scanning system of the copy machine is employed to direct stray light from a document being scanned to a second lens, without displacing the copy lens. The second lens images the document on a linear photoreceptor array, such as a CCD. A control system produces fax signals from the output of the linear array, and may also control the scanning speed of the apparatus to be optimum for the generation of fax signals.

19 Claims, 6 Drawing Sheets

5,095,372

COMBINED COPYING MACHINE AND FACSIMILE SCANNER AND METHOD

FIELD OF THE INVENTION

This invention relates to an improved apparatus that combines the functions of a copying machine and a facsimile (fax) transmitting device, and/or a high resolution scanner for computer system use, as well as to the method employing the apparatus.

BACKGROUND OF THE INVENTION

In one type of xerographic copying device that is commonly employed, as illustrated in FIG. 1, the platen 10 that receives the document 11 to be copied is fixedly mounted, and movable elongated lamps 12 illuminate a transversely extending strip of the document. This strip of the document is imaged onto a photoreceptor drum 13 via mirrors 14, 15 and 16, a spherical copier lens 15 and a further mirror 17. The mirrors 14, 15 and 16 are moved lengthwise of the document, along with the illuminating lamp, in synchronism with rotation of the drum 13, in accordance with a given relationship, in order to scan the image of the document onto the drum. For example, the mirrors 15, 16 may be moved in the same direction and at half the speed as the mirror 14. The driving of the mirrors and the lamps may be effected in any conventional manner, for example as illustrated in FIG. 2. As illustrated, a scan drive motor 20 drives a belt 21 to pass around two fixed pulleys 22, 23. One end 24 is fixed, and the belt proceeds from this end around a movable pulley 25. and thence to the pulleys 22 and 23. The mirror is affixed to a carriage driven by the belt between the pulleys 22 and 25 so that the mirror 14 is moved at the same speed as the belt. The mirrors 15, 16 are mounted to a further movable carriage that also carries a pulley 26. The belt proceeds from the pulley 23 about the pulley 26. The other end 28 of the belt is spring tensioned. As a consequence, the mirrors 15, 16 are driven in the same direction as the mirror 14, but at half the speed thereof. The speed of the motor 20 is synchronized with the rotation of the photoreceptor drum of the apparatus. A copying device of this design is disclosed, for example, in U.S. Pat. No. 4,188,113.

In order to adapt this type of system to the production of signals for fax transmission, the above patent discloses the imaging of a light spot from a laser onto the document via a rotary polygonal mirror, a separate lens, and the same longitudinally movable mirrors that are employed for conventional document copying. The rotary polygonal mirror effects the transvers scanning of the document. In this arrangement, the light from the imaged spot is reflected to a fiber optic bundle that directs the light to a photomultiplier. In a modification of this arrangement, light from the linear lamp that is employed in the copier mode is directed to one or more photomultiplier tubes via the movable copier mirrors, the separate lens, and the rotary polygonal mirror.

In the arrangement disclosed in this patent, in order to employ the apparatus in the fax mode, it is necessary to adjust the positions of the copier lens and the additional lens, as well as other optical elements. Additionally, the copy image resolution in such systems is limited by the digital image resolution. The requirement for adequate copy resolution leads to a high system cost.

SUMMARY OF THE INVENTION

The present invention is directed to the provision of a method and apparatus enabling the high resolution copying of documents and production of a serial output signal consisting of a time varying electrical signal representing successive, adjacent scans of an optical image at a chosen horizontal and vertical pixel resolution. In particular the horizontal and vertical pixel resolutions can be chosen to match those required for Group III or Group IV fax. The system is economical to produce, with a minimum of modification to the copier structure, that takes advantage of the already required copier subsystems functionality, and that enables the more rapid production of fax transmission signals, and that enables production of fax signals corresponding to images of improved quality.

Briefly stated, the invention provides a combined apparatus for producing copies of a document or the like and/or for producing fax or optical scanner signals corresponding to the document. The apparatus comprises a copy producing section having means for imaging at least a portion of an illuminated document on a drum or other photoreceptor and including a light path extending from the document via a first lens to a first photoreceptor. A scanning arrangement is provided for scanning the document whereby strips of the document are sequentially imaged on the first photoreceptor via the first lens. Stray light from the document that does not impinge upon the first lens is also produced. In accordance with the invention, a second lens fixedly positioned with respect to the first lens intercepts the stray light and image the document on the second photoreceptor. The second photoreceptor comprises an array of photosensitive elements, such as a CCD. A circuit arrangement coupled to the second photoreceptor generates the optical scanner or fax signals. In accordance with the invention, the copies and optical scanner or fax signals may be alternately produced without moving the first lens with respect to the optical path.

The scanning arrangement may be a mirror arrangement mounted to direct light from the document to the first lens, whereby the stray light is reflected from the mirror arrangement to the second lens, with means being provided for moving the mirror arrangement to scan the document.

The circuit arrangement may include a video buffer for storing signals from the CCD, and control means coupled to the buffer for producing fax signals from data stored in the buffer. The control means may also control the speed of scanning of the scanning means in order to generate fax signals at the maximum transmission rate.. The scanning of the document may be either continuous or stepwise.

The control system may include a page memory for storing signals, so that ability to provide the copy function may be restored prior to the actual transmission of fax signals.

The invention also is directed to the provision of a method of producing fax or optical scanner signals in a copy machine of the above type, including directing light from the scanning arrangement to a second photoreceptor comprised of a linear array of photosensitive elements via a second lens to image the portions of the document on the elements of the second photoreceptor, without moving the first lens from the optical path.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 3:
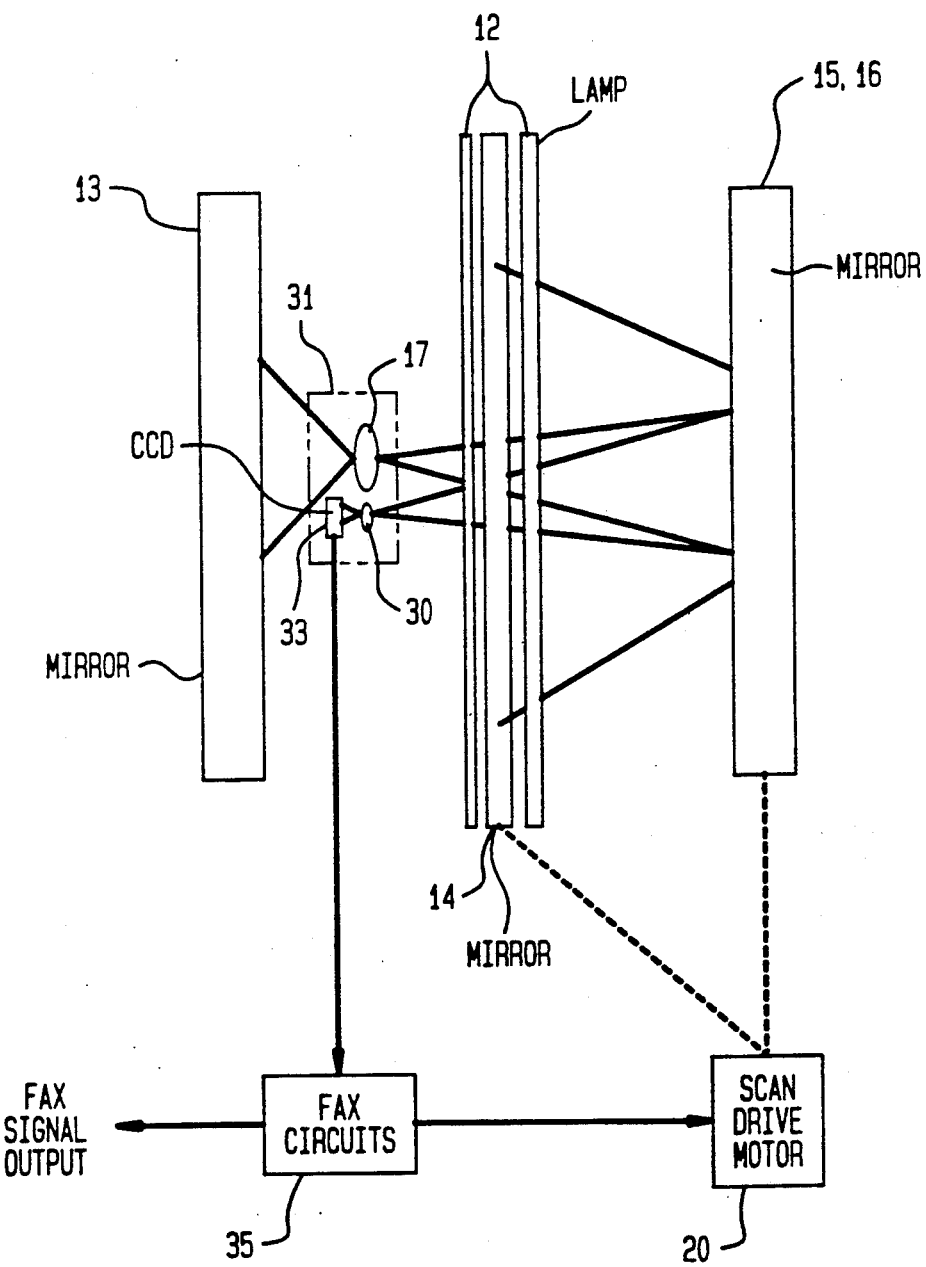
FIG. 3 is a simplified illustration of an apparatus in accordance with the invention.

Referring now to FIG. 3 of the drawings, therein is illustrated a simplified top view of one embodiment of a combined copying and fax apparatus in accordance with the invention. In this arrangement it will be observed that the mechanical structure and the optical path for effecting the copier function has not been altered from that as described above. As illustrated, an additional lens 30, which may be a spherical lens, is mounted adjacent the main copier lens 17, to intercept light from the same strip of the document as the main lens. The light intercepted by the lens 30 may hence be considered to be "stray" light, and the positioning of the lens 30 hence does not interfere at all with the operation of the copier. Accordingly, the lens 30 may be fixedly mounted on a common carrier 31 with the main copier lens, whereby no adjustment or movement of the two lenses is required when alternating between the copier and fax functions of the apparatus. It is of course apparent that the lenses may be mounted in a different manner than on a common carrier.

Figure 1:
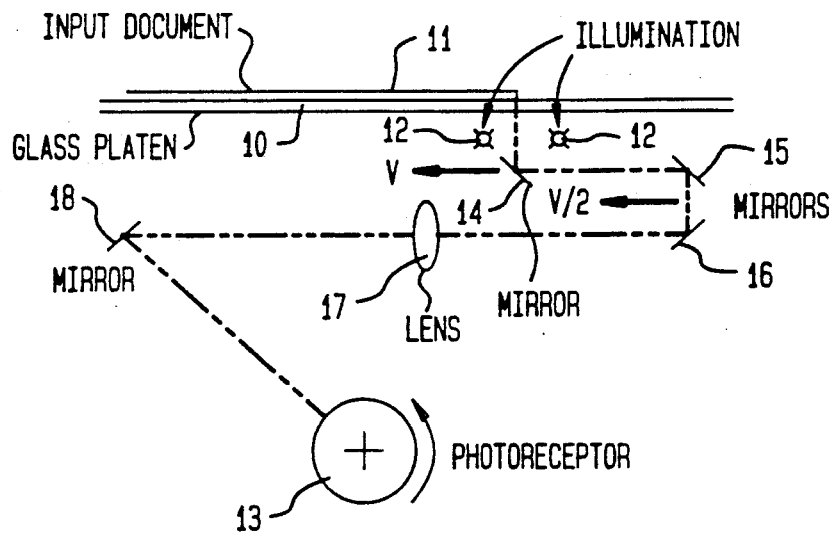
FIG. 1 is a simplified illustration of a known copying apparatus.
Figure 2:
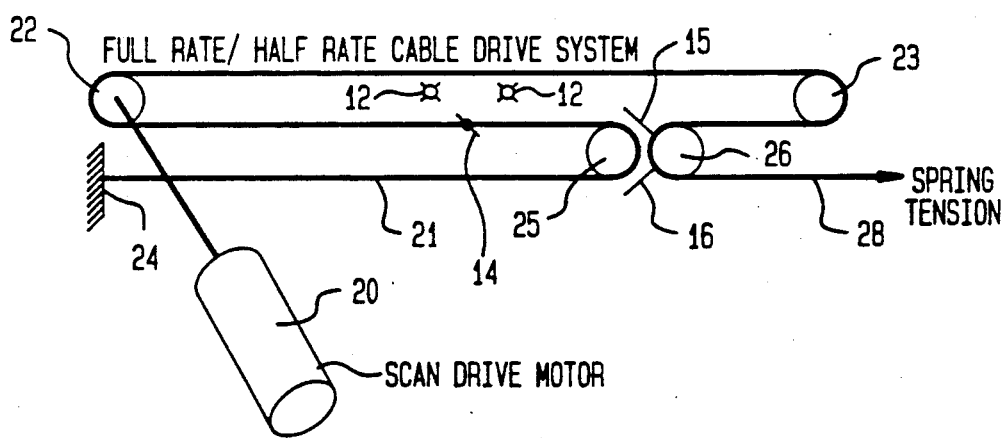
FIG. 2 is a simplified illustration of a prior art mirror driving arrangement for the apparatus of FIG. 1.
Figure 4:
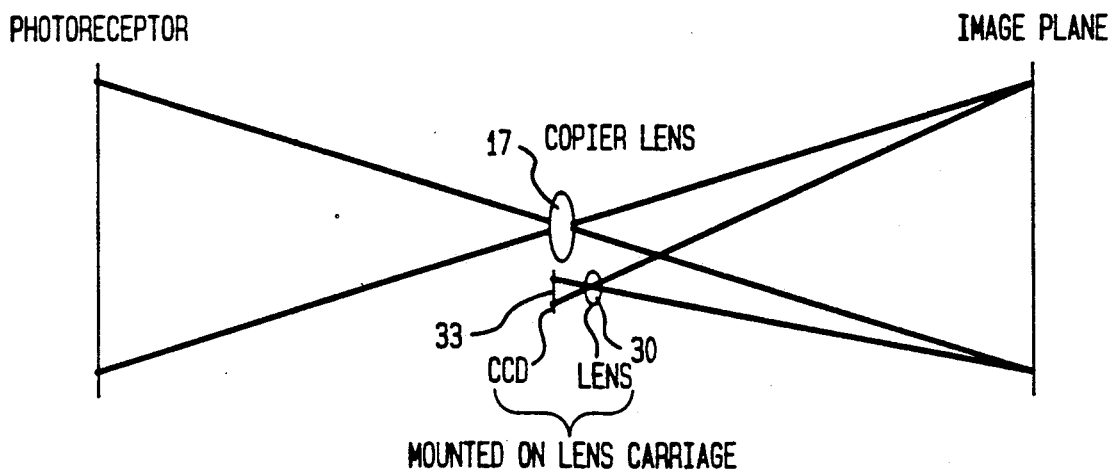
FIG. 4 illustrates an opened up optical diagram of the apparatus of FIG. 3.

As seen in FIG. 3 and the opened up optical path diagram of FIG. 4, the light received by the lens 30 is imaged onto a CCD. For Group III fax transmission it is preferred that the CCD have approximately 200 elements per inch of width or an integral multiple thereof of a nominal 8.5 inch wide document handled by Group III fax, thus having, for example, about 1700 elements. The 200 elements per inch resolution is intended to approximate standard horizontal Group III fax resolutions which range from about 196 to 204 lines/inch. For fax scanning simplicity and image quality it is important that the scanning resolution and fax lines/inch provide for mapping one to the other. 1:1 and 2:1 scanning to fax resolutions are particularly preferred. For higher resolution scanning than for fax, such as for computer image scanning, higher resolution, and cost, CCDs and associated electronics are required. CCD devices of this type are much smaller than the copier photoreceptors. Therefore, lens 30 serves to reduce the image onto the face of the CCD. The output of the CCD is applied to fax circuit 35 which will be subsequently described. The fax circuit 35 outputs fax signals for transmission, and may also control the speed of operation of the scan drive motor 20.

One control system in accordance with the invention is illustrated in FIG. 4. In this system, a controller 50, for example a microcomputer, controls the speed of the scan drive motor 20 which drives the longitudinal scanning structure of the copier e.g. the mirrors 14, 15, 16 and illumination system 12. The speed control of the scanning mechanism enables the apparatus to scan the document at an optimum speed for the generation of fax signals at the limiting transmission rate, which differs from that employed for making copies of a document and varies with the image complexity of the document region being scanned..

The speed control of the scanning mechanism may be effected in conventional manner via a frequency control circuit 51 and a phase locked loop controller 52.

The signals applied from the elements of the CCD to the video memory 53 via an amplifier 54 correspond to 200 pixels per inch for Group III fax. In this format, the signals are compressed via preestablished conventions which generally involve run length encoding by the signal compressor 55, modulated in the modulator 56 and applied to the port 57 for transmission over the phone line.

Figure 5:
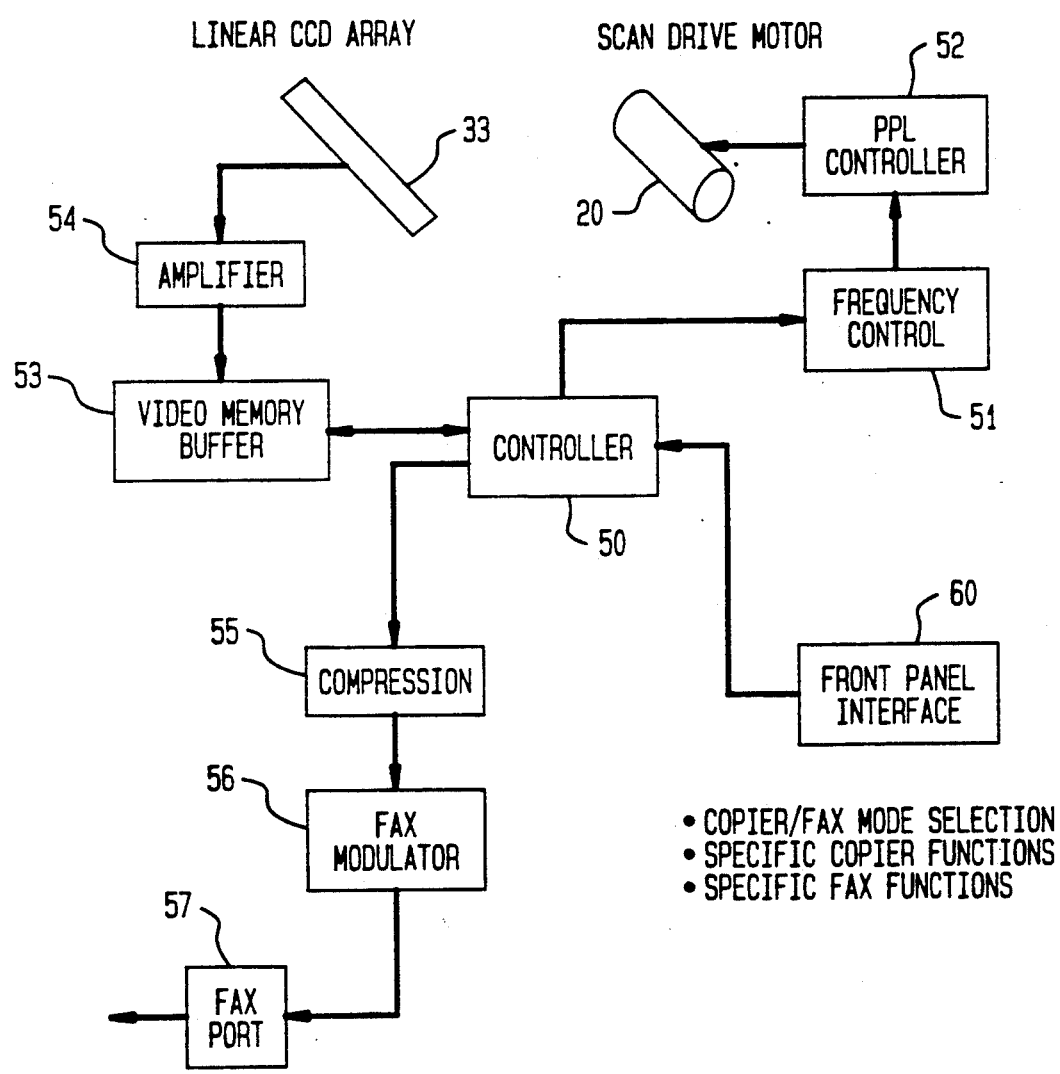
FIG. 5 is a block diagram of one apparatus in accordance with the invention.

The system of FIG. 5 also includes a front control panel interface 60 to enable the user to select the mode of operation of the apparatus, i.e. as a copier or the various fax scanning modes.

Figure 6:
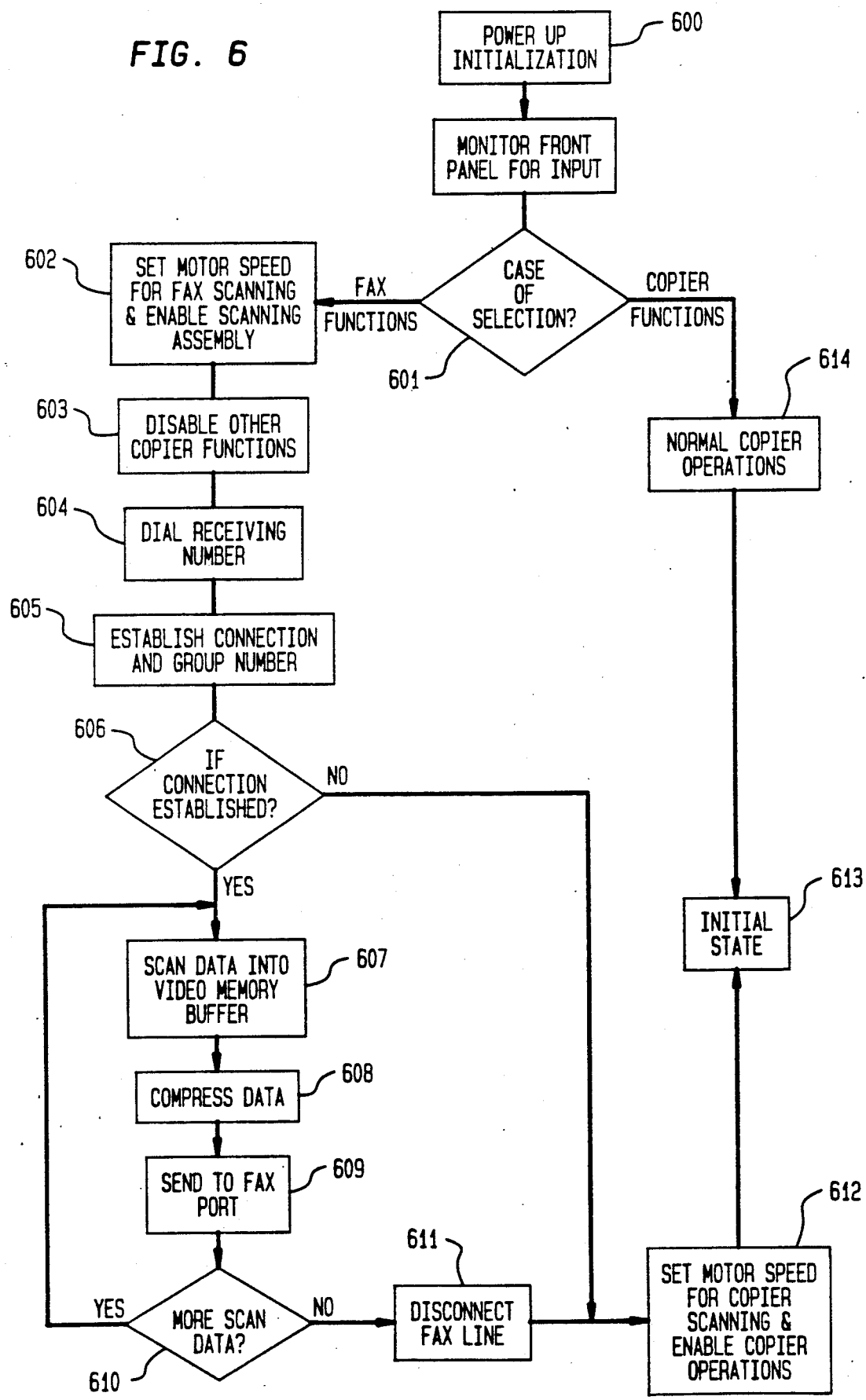
FIG. 6 is a flow diagram illustrating the operation of the apparatus of FIG. 5.

In the operation of the system of FIG. 5, as illustrated in FIG. 6, after power-up an initialization (Block 600), the program tests (Block 601) for the status of the front panel controls, i.e. whether the user has selected the copier or fax functions. If the fax mode has been selected, the controller 50 controls the motor 20 to move the scanning mirrors at the desired rate for production of fax signals, and the mirror scanning assembly is enabled (Block 602). The functions of the copier that are not employed in the fax mode may be disabled (Block 603). For example, it may be desirable to disable the paper feed equipment to inhibit the possibility of paper jams as well as wasting paper, inhibit rotation of the drum, turn off the charging devices, etc.

The controller 50 may now dial the recipient of the fax (Block 604), or enable the user to manually dial the recipient, in conventional manner, to establish a connection and group number with the recipient (Block 605). If a connection is established (Block 606), the scanning motor is energized to scan the document, whereby the signal output of the CCD is stored in the Video Memory Buffer 53. This data is then compressed (Block 608) in conventional manner, under control of the controller 50, and applied to the fax output port for transmission to the recipient (609).

In this arrangement it is thus apparent that the scanning motor 20 is controlled to scan the document at a rate in synchronism with the transmission rate of the fax signals.

Following the transmission of the data in the storage buffer, if the system senses that a further document is present to be scanned (Block 610), the program loops back to direct further scan data into the buffer 53. Otherwise the fax line is disconnected (Block 611), the motor speed and other parameters are reset for copier operation (Block 612), and the apparatus returns to its initial state to sense for front panel instructions (Block 613).

If a connection had not been established (Block 606), the program reset the apparatus for copier operation at Block 612.

If instructions were received from the front panel for use of the copier function, the apparatus proceeds to make copies in the conventional manner (Block 614).

Figure 7:
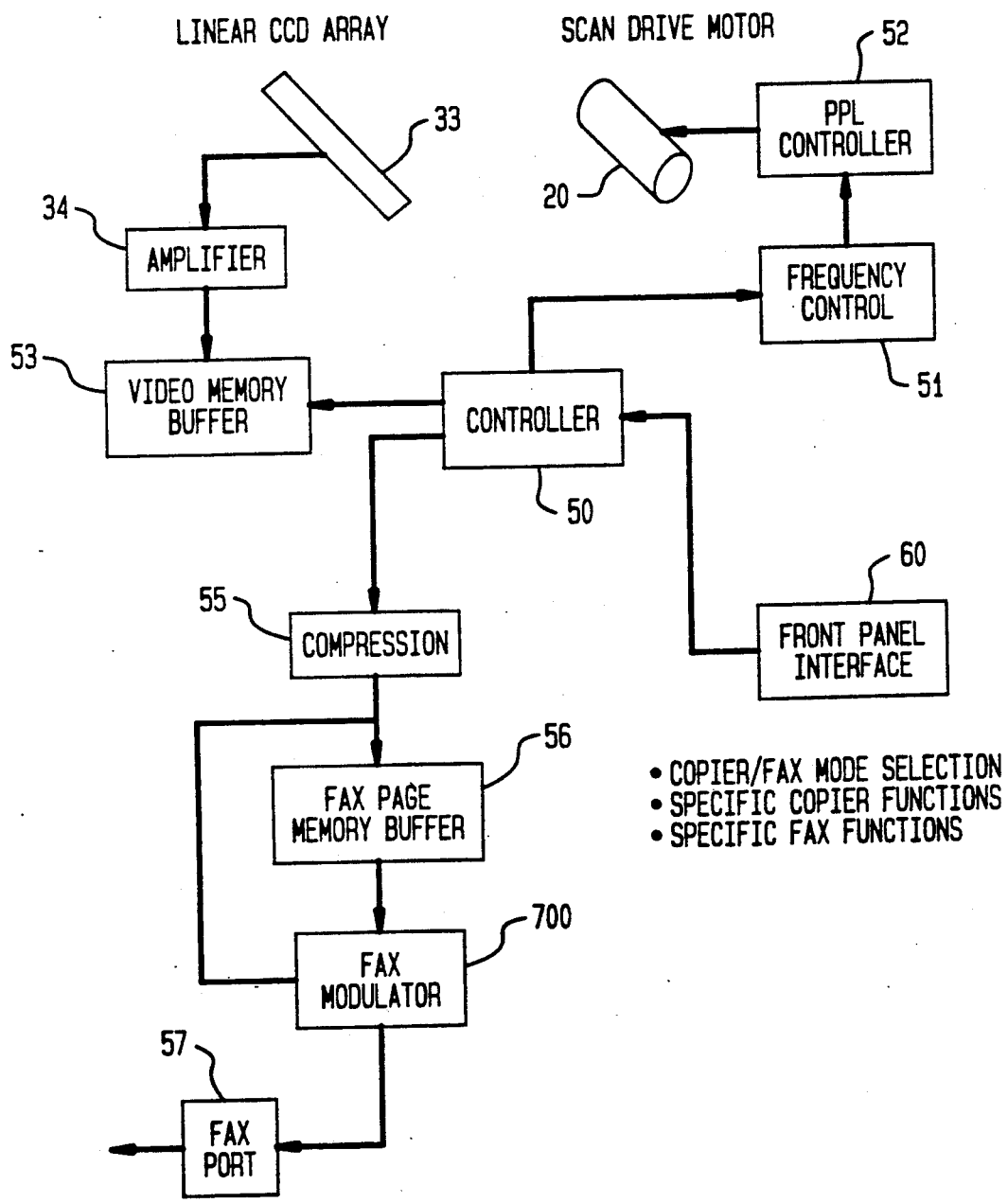
FIG. 7 is a block diagram of a modification of the invention.

Alternatively to the above described method, and shown in FIG. 7, the controller 50 may control the scan motor to continuously longitudinally scan the document, rather than at a slowed variable speed manner. This scanning may advantageously be effected at an average speed higher than that employed in the above discussed slowed variable speed manner, and it may be compatible with speeds employed in conventional copier scanning operations. In this modification of the invention, as before, the data is temporarily stored in the video buffer 53. The data in the buffer 53 is, in this case, can be compressed but can not be modulated and transmitted. Consequently the controller 50 reads data from the buffer and compresses the data to reduce the required digital memory capacity to store the scanned image (Block 700). While this technique requires the incremental cost for the page buffer memory 700, the control of the motor is simplified, and fax scanning is completed more rapidly and the motor may be operated at a speed sufficient that the system can also enable the simultaneous copying of the document in the conventional manner. In this latter case, which may be provided as a separate front panel control option, the copier functions are not disabled at Block 603.

Figure 8:
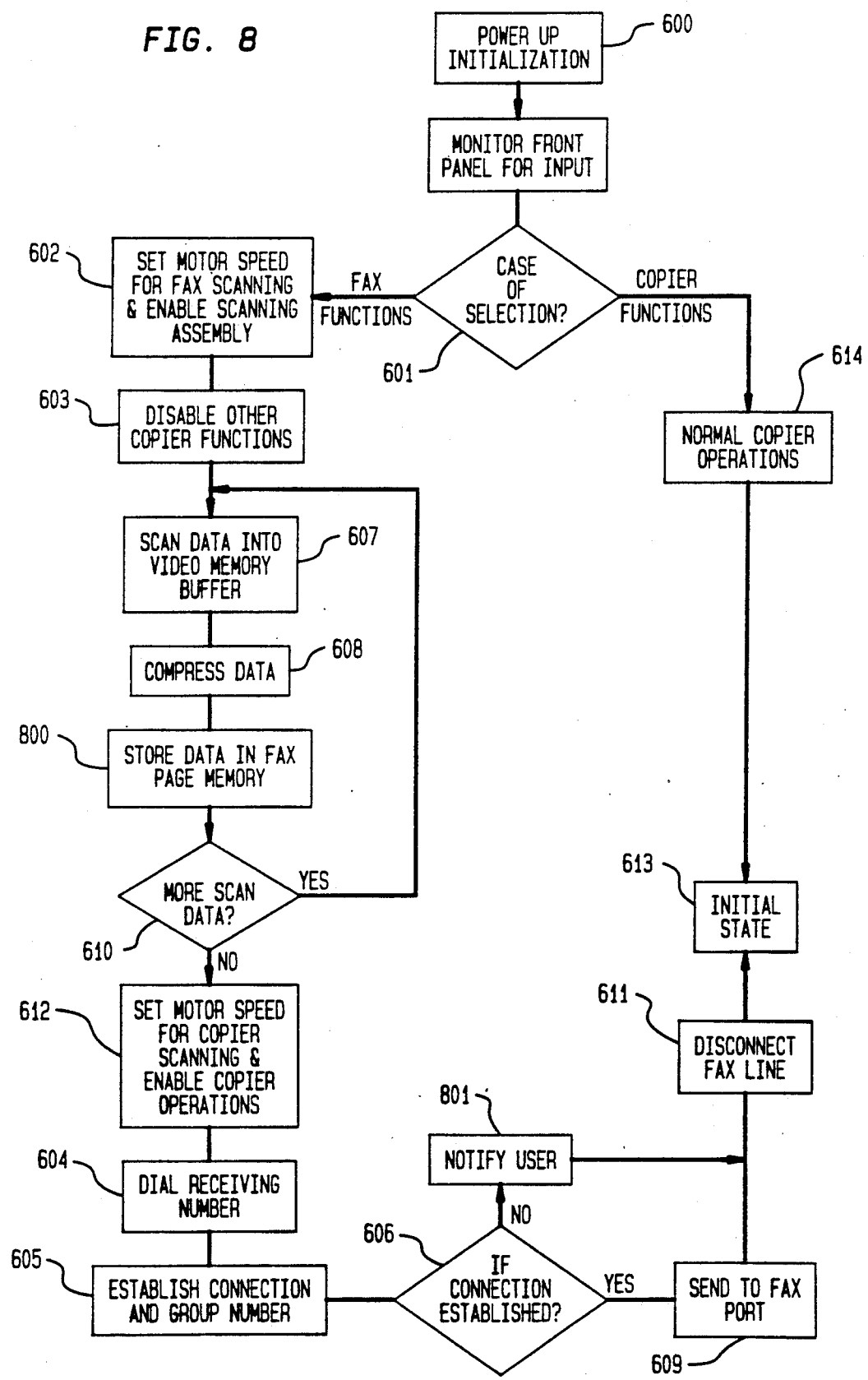
FIG. 8 is a flow diagram illustrating the operation of apparatus of FIG. 7.

FIG. 8 illustrates one method for employing the system of FIG. 7. As in the arrangement of FIG. 6, upon sensing a request for the transmission of a fax message, the motor speed is set for fax scanning and copier functions may be disabled. As distinguished from the method of FIG. 6, however, the system is controlled to scan data into the video memory buffer prior to establishing a connection with the recipient. Similarly, the data is compressed, also prior to establishing a connection, and stored in the fax page memory buffer 700 (Block 800). The scanning continues until there is no more data to be scanned. The controller 50 now controls the system to reset the motor speed and other functions for copier use, at Block 612. At this time the recipients number is dialed to establish a connection, and, if a connection is established, the fax message is sent from the fax page memory buffer 700, modulated and sent to the fax port for transmission.

The arrangement and method of FIGS. 7 and 8 provide the advantage that the time required by the fax function and operator is minimized, so that the system is capable of being again used to make copies in a shorter time than required and the operator returns to his or her desk faster than in the system and method of FIGS. 5 and 6.

If desired, as indicated by Block 801 of FIG. 8, an indication may be given at the copy machine that a connection to the recipient was made or was not made.

It will of course be apparent that the invention is not limited to use in combination with copying machines wherein document is scanned by movement of optical elements, such as mirrors, in the optical path, but is also adaptable to copying machines of the type wherein the document itself is moved to effect longitudinal scanning thereof by the optical system.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In a combined apparatus for producing copies of a document or the like and for producing a serial image signal representing sequential line scans perpendicular to a scan direction of the document, wherein the apparatus comprises a copy producing section having means for imaging at least a portion of an illuminated document on a photoreceptor and including a light path extending from the document via a first lens to a first photoreceptor, and means for scanning said document whereby strips of said document are sequentially imaged on said first photoreceptor via said first lens and stray light from said document, which stray light does not impinge upon said first lens, is also produced, the improvement comprising a second photoreceptor, a second lens fixedly positioned with respect to said first lens to intercept said stray light and focus said stray light on said second photoreceptor to image said document, said second photoreceptor comprising an array of photosensitive element, and means coupled to said second photoreceptor for generating said signal, whereby said copies and fax signals may be alternately produced without moving said first lens with respect to said optical path.

2. The apparatus of claim 1 wherein said means for scanning comprises a mirror arrangement mounted to direct light from said document to said first lens, whereby said stray light is reflected from said mirror arrangement to said second lens, and means for moving said mirror arrangement to scan said document.

3. The apparatus of claim 1 wherein said second photoreceptor is a CCD.

4. The apparatus of claim 1 wherein means coupled to said second photoreceptor comprises a buffer for storing signals from said buffer, and control means coupled to said buffer for producing said signal from data stored in said buffer.

5. The apparatus of claim 4 wherein said control means comprises means for controlling the speed of scanning of said scanning means.

6. The apparatus of claim 5 wherein said control means comprises means for controlling said scanning means for stepwise movement during the production of said signal.

7. The apparatus of claim 5 wherein said control means comprises means for controlling said scanning means for continuous movement during the production of said signal.

8. The apparatus of claim 1 wherein said signal is a fax signal.

9. In a combined apparatus for the production of copies corresponding to an illuminated document or the like and the production of a serial image signal representing sequential line scans perpendicular to a scan direction of the document, including a copy section having a first fixed lens, a mirror arrangement for directing light from said document to said first lens for imaging a portion of said document on a first photoreceptor, and means for moving said mirror arrangement to scan said document, the improvement comprising a second photoreceptor, a second lens fixedly mounted with respect to said first lens and positioned to direct stray light, which stray light does not impinge upon said first lens, from said mirror arrangement to said second photoreceptor to image said portion of said document on said second photoreceptor, whereby said portion of said document is imaged on said second photoreceptor without displacement of said first lens in said apparatus, said second photoreceptor comprising a linear array of photosensitive elements, and means coupled to said second photoreceptor for producing said signal.

10. The apparatus of claim 9 wherein said second photoreceptor comprises a CCD.

11. The apparatus of claim 9 wherein said first and second lenses and second photoreceptor are affixed to a common carriage.

12. The apparatus of claim 9 wherein said means coupled to said second photoreceptor comprises a buffer memory for storing data received from said second photoreceptor, and control means coupled to said buffer memory for producing said signal therefrom.

13. The apparatus of claim 12 wherein said control means comprises means for controlling said mirror moving means to move said mirror arrangement stepwise.

14. The apparatus of claim 12 further comprising a page memory, said control means comprising means for storing said signal in said page memory.

15. The apparatus of claim 14 wherein said control means comprises input means, means responsive to a determined signal from said input means for controlling the production of said signal and storage thereof in said page memory and for disabling said copy section from producing copies, means responsive to the storage of signal in said page memory for enabling said copy section to produce copies, and means for transmitting signal stored in said page memory while said copy section is enabled.

16. The apparatus of claim wherein said signal is a fax signal.

17. The method of producing a serial image signal representing sequential line scans perpendicular to a scan direction of a document in a copy machine having a first lens, and a scanning arrangement for directing light from portions of a document or the like to a first lens in a given optical path for imaging portions of said document on a first photoreceptor, the improvement comprising directing stray light, which stray light does not impinge on said first lens, from said scanning arrangement to a second photoreceptor comprised of a linear array of photosensitive elements via a second lens to image said portions of said document on the elements of said second photoreceptor, without moving said first lens from said optical path.

18. The method of claim 17 further comprising changing the speed of scanning of said scanning apparatus.

19. The method of claim 17 further comprising storing signals from said second photoreceptor, disabling said copy machine prior to said step of storing signals, enabling said copy machine following said step of storing signals, and transmitting said signals following said step of enabling said copy machine.

* * * * *